United States Patent
Simpson et al.

(10) Patent No.: US 7,422,310 B2
(45) Date of Patent: Sep. 9, 2008

(54) METHODS AND APPARATUS FOR SELECTING IMAGE ENHANCEMENT TECHNIQUES

(75) Inventors: Shell S. Simpson, Boise, ID (US); Eugene A. Roylance, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/423,255

(22) Filed: Apr. 25, 2003

(65) Prior Publication Data

US 2004/0212671 A1 Oct. 28, 2004

(51) Int. Cl.
G03G 15/00 (2006.01)

(52) U.S. Cl. .......................... 347/43; 347/12

(58) Field of Classification Search ............... 347/7, 347/9, 19, 14, 104, 105; 399/12, 43
See application file for complete search history.

(56) References Cited

U.S. PATENT DOCUMENTS

| | | | |
|---|---|---|---|
| 4,847,641 A | 7/1989 | Tung | |
| 5,005,139 A | 4/1991 | Tung | |
| 5,049,898 A | 9/1991 | Arthur | |
| 5,134,495 A | 7/1992 | Frazier | |
| 5,193,008 A | 3/1993 | Frazier | |
| 5,515,480 A | 5/1996 | Frazier | |
| 5,610,635 A * | 3/1997 | Murray et al. | 347/7 |
| 5,630,026 A | 5/1997 | Ogletree | |
| 5,729,270 A | 3/1998 | Wright | |
| 5,898,505 A | 4/1999 | Lin | |
| 5,920,336 A | 7/1999 | Lawton | |
| 5,929,892 A | 7/1999 | Towner | |
| 5,930,553 A * | 7/1999 | Hirst et al. | 399/8 |
| 5,986,681 A | 11/1999 | Wright | |
| 5,987,221 A | 11/1999 | Bearss | |
| 6,070,022 A * | 5/2000 | Kobayashi et al. | 399/12 |
| 6,158,837 A | 12/2000 | Hilton et al. | |
| 6,175,375 B1 | 1/2001 | Able et al. | |
| 6,655,779 B2 * | 12/2003 | Usui et al. | 347/19 |
| 2002/0021906 A1 * | 2/2002 | Yoshizaki et al. | 399/12 |
| 2002/0041767 A1 | 4/2002 | Saito | |
| 2003/0090559 A1 | 5/2003 | Okano | |

FOREIGN PATENT DOCUMENTS

JP 11223967 8/1999

* cited by examiner

*Primary Examiner*—Julian D Huffman

(57) ABSTRACT

A memory integrated into a removable cartridge for an image forming device is formatted to store a state variable reflecting a state of a printing component. A method embodiment includes reading the state variable. An image enhancement technique, selected according to the state variable, is implemented. In another embodiment, the memory contains technique selection criteria. The technique selection criteria is processed with the state variable to select a template set identifying one or more image enhancement techniques.

24 Claims, 4 Drawing Sheets

METHODS AND APPARATUS FOR SELECTING IMAGE ENHANCEMENT TECHNIQUES

BACKGROUND

Image forming devices such as laser printers, copy machines, and facsimile machines employ electro photographic processes to produce printed images on paper or other print media. In laser printers, a source image is rasterized to form a bitmap image for subsequent rendering to a final printed image. A source image can include a number of elements. Examples include text, line art, and/or continuous tone or graphic elements such as a photo. When a source image is rasterized creating a bitmap image, the various elements are converted to pixel patterns that approximate the source image.

Once a bitmap image is generated from a source image, it can be printed by modulating and scanning a laser beam across a charged surface of a photoconductive drum in a succession of scan lines. Each scan line is divided into pixel areas, and the modulated laser beam causes some pixel areas to be exposed to a light pulse and some not. Where a pixel area is illuminated, the photosensitive drum is discharged so that, when it is subsequently toned, the toner adheres to the discharged areas and is repelled by the still charged areas. The toner adhering to the discharged areas is then transferred and fixed to paper or other print media.

Because of its digital nature, a printed bitmap image does not perfectly reflect the source image. For example, printed image edges that are either not parallel and not perpendicular to the scan direction of the laser can appear stepped or jagged. This is especially noted for text and line art. Because resolution is also limited, a bitmap representation of a graphical element such as a photo can appear degraded.

Various image enhancement techniques have been developed to improve the quality of a printed bitmap image. These enhancement techniques include: edge smoothing, fine line broadening, anti-aliasing, and resolution doubling. In a laser printer for example, one or more techniques can, when implemented, modulate the laser to produce a pixel smaller than a standard pixel size. The techniques may also indicate that the laser output is to be offset from the pixel center. Parameters for a particular image enhancement technique can dictate pixel size and offset position.

In addition to improving the quality of printed images, printer manufacturers are also faced with reducing the cost associated with printing those images. One of the more significant operation costs of a printer is that of imaging material such as toner and ink. Recognizing this, various imaging enhancement techniques have been developed in an effort to conserve imaging material.

The various moving components of an image forming device, especially the photoconductive drum, wear and degrade through use. Use exposes the photoconductive drum to paper and toner particles that can leave scratches on the drum's surface. Scratches reduce the effective resolution of the drum. For example, when the drum is exposed to a laser, a larger than intended area of the drum may be discharged because of a scratch. Use can also cause the photoconductive drum to "thin." Thinning is caused by ozone which results from the electrical charge used to "erase" the photoconductive drum after each page is printed. The ozone reacts with the surface material of a photoconductive drum causing the drum to thin over time. As it becomes thinner, a photoconductive drum becomes less effective in maintaining a charge differential between those parts of the drum that are exposed to a laser and those parts that are not.

In many image forming devices, the photoconductive drum is integrated in a cartridge that also serves as a reservoir for toner. When the toner is depleted, the cartridge can be removed from the image forming device and replaced. The rated life of a cartridge can be measured by the amount of toner it holds. In other words, the components of the cartridge are designed to, at a minimum, outlast the toner. Photoconductive drums are designed to enable printing for the rated life of the cartridge such that thinning and scratching usually do not affect print quality.

Modern image forming devices are capable of producing pixels as small as 1/600th of an inch. However, image enhancement techniques can modulate the laser at the sub-pixel level. Many techniques are capable of modulating the laser at 1/64th of a pixel—producing a dot as small as 1/38,400th of an inch. When modulating the laser at 1/38,400th of an inch the minor changes in the photoconductor become significant—sometimes causing image enhancement techniques to degrade rather than improve the quality of printed output.

DETAILED DESCRIPTION

INTRODUCTION: Many image enhancement techniques involve directly controlling the hardware components responsible for producing a printed image. In a laser printer for example, a given technique may guide the modulation and deflection of a laser in order to improve the resolution of the printed image. When the limited life components wear through continued use, these image enhancement techniques can become less effective and can even degrade the printed image. To help maintain consistent print quality, image enhancement techniques and/or parameters for implementing those techniques are selected based upon the extent to which the limited life components of an image forming device have been used.

The terms image forming device, image enhancement techniques, and limited life components are used throughout the following description. An image forming device is any device that can produce a printed image on paper or any other print media. Examples include, ink printers, laser printers, facsimile machines, copiers, and all-in-one or multi-function printers. Image enhancement techniques include any techniques that can improve the quality of printed output as well as any techniques that can reduce the amount of consumables such as toner or ink toner used to produce the printed output. Selecting an image enhancement technique can involve selecting a particular technique and/or selecting parameters for implementing a technique. Limited life components are those components of an image forming device that degrade or wear though use such that the wear can affect print quality. Often, limited life components are integrated within a cartridge along with consumables such as ink or toner. The cartridge, then, is removable and replaceable.

Figure 1:
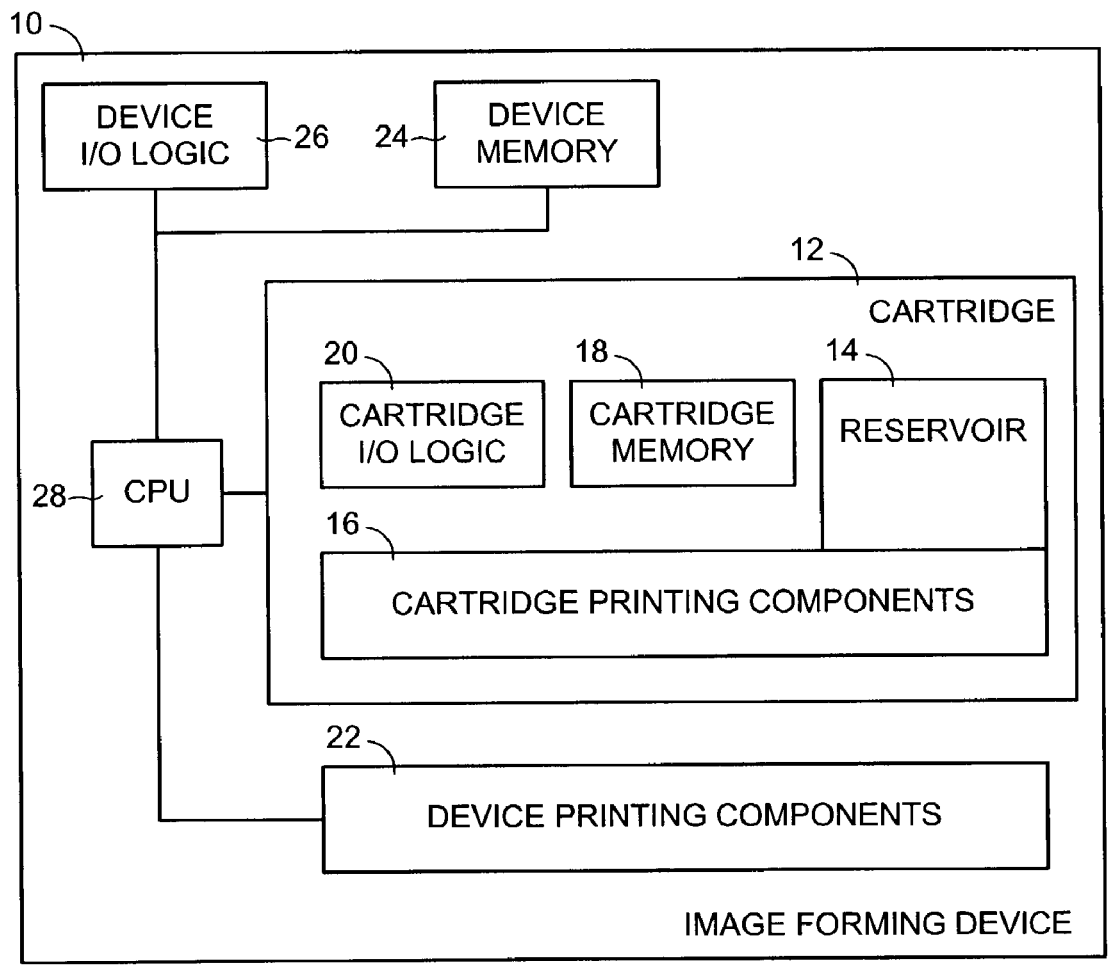
FIG. 1 is a schematic representation of the physical and logical components of an exemplary image forming device according to an embodiment of the present invention.

COMPONENTS: The physical and logical components of various embodiments of the invention will now be described with reference to the block diagrams of FIGS. 1-6. FIG. 1 schematically depicts an exemplary image forming device referenced as image forming device 10 with an exemplary cartridge referenced as cartridge 12. Cartridge 12 represents generally any apparatus supplying one or more components needed by image forming device 10 to produce a printed image. Preferably, cartridge 12 can be easily removed from image forming device 10 and replaced. Cartridge 12 can then provide the limited life components. When cartridge 12 reaches the end of its useful life, it can be replaced supplying new components so that image forming device 10 can continue to be used. More detailed examples of cartridge 12 are described below with reference to FIGS. 2 and 3.

As shown in FIG. 1, cartridge 12 includes reservoir 14, cartridge printing components 16, cartridge memory 18, and cartridge I/O (Input/Output) logic 20. Reservoir 14 represents generally any compartment for holding and dispensing imaging material such as ink or toner. Cartridge printing components 16 represent hardware capable of being used to help produce a printed image using imaging material from reservoir 14. Cartridge printing components 16 can be limited life components. Cartridge memory 18 represents generally any single memory device or combination of memory devices. Cartridge memory 18 can be or include a rewritable, persistent storage apparatus, including flash memory, EEPROM, battery backed RAM, magnetic media, and optical magnetic media. Cartridge I/O logic 20 represents any combination of hardware and/or programming that enables communication with memory 18.

Image forming device 10 also includes device printing components 22, device memory 24, device I/O logic 26, and CPU (Central Processing Unit) 28. Device printing components 22, when used in conjunction with cartridge printing components 16, represent hardware capable of dispensing a consumable from reservoir 14 onto print media in the form of a desired print image. The printed image can include any combination of text and/or graphics. Device memory 24 represents any memory device or combination of memory devices that can store programming and other data used to guide cartridge and device printing components 16 and 22 in the production of a printed image. Device I/O logic 26 represents generally any combination of hardware and/or programming that enables programming stored in device memory 24 to communicate with cartridge I/O logic 20 to access cartridge memory 18. Device I/O logic 26 is responsible for both reading data from and writing data to cartridge memory 18. CPU 28 represents any processor capable of executing instructions from programming stored in device memory 24 and cartridge memory 18. At least some of the executed instructions guide cartridge and device printing components 16 and 22 to form a desired image on print media.

Figure 2:
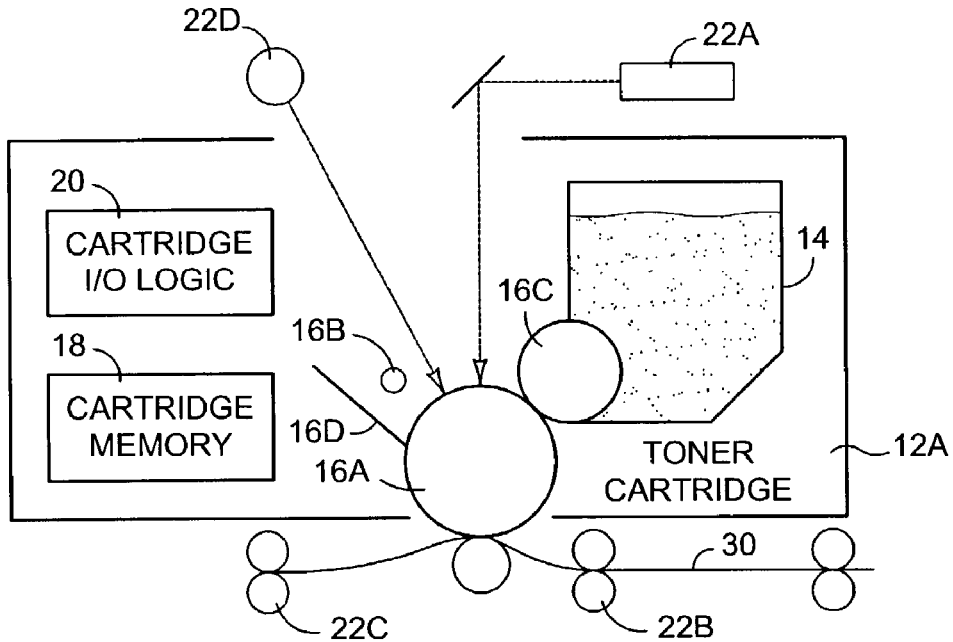
FIG. 2 is a schematic representation of exemplary cartridge and device printing components of FIG. 1 according to an embodiment of the present invention.
Figure 3:
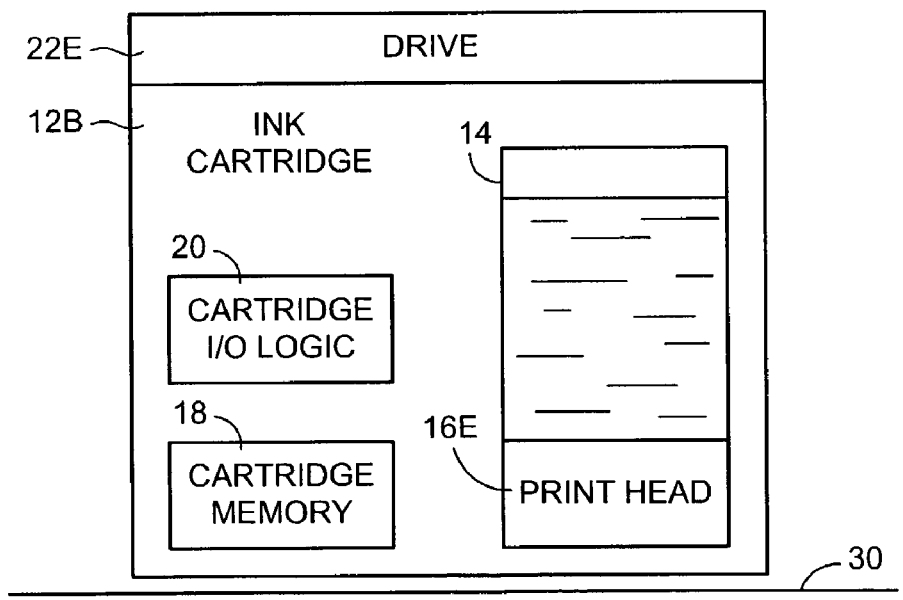
FIG. 3 is a schematic representation exemplary cartridge and device printing components of FIG. 1 according to another embodiment of the present invention.

FIGS. 2 and 3 illustrate two different exemplary cartridge types. In FIG. 2, cartridge 12 is a toner cartridge 12A. In FIG. 3, cartridge 12 is an ink cartridge 12B. In the example of FIG. 2, cartridge printing components 16 include photoconductive drum 16A, charging device 16B, developer 16C, and wiper 16D. FIG. 2, also shows device printing components 22 which include laser 22A, charge rollers 22B, fuser rollers 22C, and discharge lamp 22D.

In operation, charging device 16B places a uniform electrostatic charge on photoconductive drum 16A. Light from laser 22A is scanned across photoconductive drum 16A in a pattern of a desired print image. Where exposed to the light, photoconductive drum 16A is discharged creating an electrostatic version of the desired print image. Developer 16 transfers charged toner particles from toner reservoir 14A to photoconductive drum 16A. The charged toner particles are repelled by the charged portions of photoconductive drum 16A but adhere to the discharged portions. Charge roller 22B charges or discharges media sheet 30. As media sheet passes across photoconductive drum 16A, toner particles are then transferred from photoconductive drum 16A to media sheet 30. Fuser rollers, thermally fix the transferred toner particles to media sheet 30. Discharge lamp 22D removes the remaining charge on photoconductive drum 16A, and wiper 16D removes any residual toner particles remaining on photoconductive drum 16A.

In the example of FIG. 3, device printing components 16 of ink cartridge 12B includes print head 16E. Device printing components 22 include drive 22E. In operation, print head 16E selectively ejects ink from reservoir 14 onto media sheet 30 according to a desired print image. Drive 22E selectively moves and positions the print head 16E relative to media sheet 30 such that the ejected ink forms the desired print image.

Figure 4:
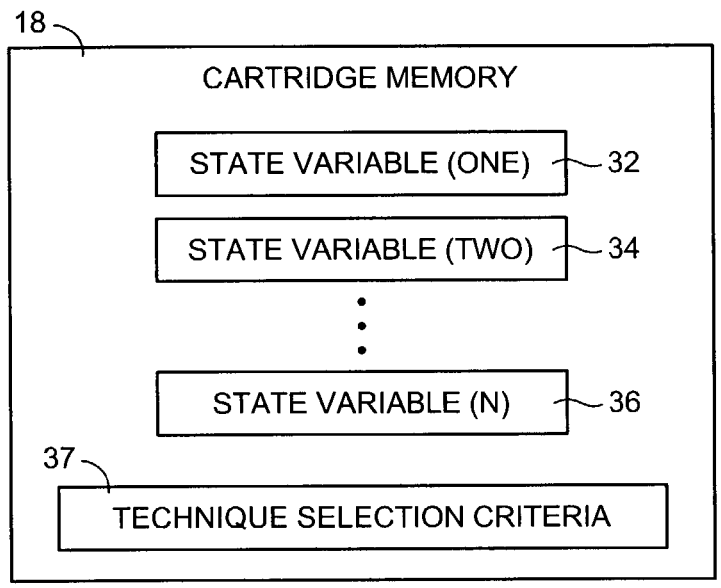
FIG. 4 schematically illustrates state variables stored in cartridge memory according to an embodiment of the present invention.

Referring now to FIG. 4, cartridge memory 18 is formatted to contain state variables 32-36 and technique selection criteria 37. State variables 32-36 are generally a collection of variables used to assist in selecting image enhancement techniques. State variable 32-36 are periodically updated so that different image enhancement techniques are selected at different times over the life of cartridge 12 and, more specifically, over the limited life of cartridge printing components 16. State variables 32- 36 are variables that in some manner reflect the age or wear of cartridge printing components 16. With reference to FIG. 2, a given state variable 32 may represent the amount of toner remaining in reservoir 14. Another state variable 34 may represent the duration that photoconductor drum 16A has been exposed to laser 22A and/or discharge lamp 22D. Another state variable 36 may reflect the number of pages printed using cartridge 12. Technique selection criteria 37 represents electronic data that can be processed with one or more state variables 32-36, to select one or more image enhancement techniques. Different image enhancement techniques are selected as the values of state variables 32-36 change.

Figure 5:
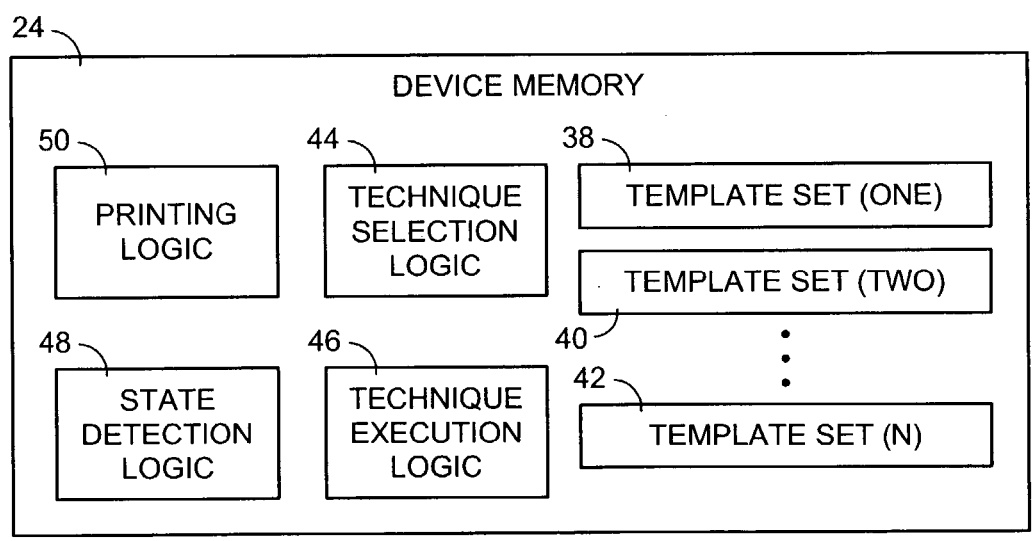
FIG. 5 schematically illustrates programming and other data stored in device memory according to an embodiment of the present invention.

Referring to FIG. 5, device memory 24 contains template sets 38-42, technique selection logic 44, technique execution logic 46, state monitor 48, and printing logic 50. Each template sets 38-42 represents criteria for selecting an image enhancement technique or for selecting from among image enhancement techniques. The phrase "selecting an image enhancement technique" can mean selecting a particular image enhancement technique or selecting parameters for implementing an image enhancement technique. The phrase "selecting from among image enhancement techniques" can mean selecting a particular image enhancement technique from a plurality of techniques or selecting a parameter or parameters from a plurality of parameters for implementing an image enhancement technique. As an example, each template set 38-42 may include one or more conditions. Associated with each condition is data identifying one or more image enhancement techniques and/or parameters for implementing the technique or techniques. A condition is a circumstance that when met indicates the image enhancement technique(s) and any parameter(s) associated with that condition are to be implemented. The following are examples of conditions and associated techniques.

- A condition may be met upon determining that text or line art is being printed. That condition could be associated with an image enhancement technique for edge smoothing.
- A condition may be met upon determining that a halftone image is being printed. That condition could be associated with an image enhancement technique for improving halftone images.
- A condition may be met upon determining that a solid area is being printed. That condition could be associated with an image enhancement technique for conserving imaging material.

By way of example, identified image enhancement techniques identified by template sets 32-36 may include anti-aliasing, resolution enhancement, resolution doubling, halftone enhancement, and toner conservation. Template set 38, for example, may identify all available image enhancement techniques and/or parameters most demanding on cartridge printing components 16. Template set 40 may identify all available image enhancement techniques and/or parameters less demanding on cartridge printing components 16. Template set 42 may not identify all available image enhancement techniques. For those it does identify, it may specify parameters that are least demanding on cartridge printing components 16.

Technique selection logic 44 represents generally any programming capable of processing technique selection criteria 37 to select image enhancement techniques. It is noted that selecting a technique can involve selecting the particular technique and/or parameters for implementing that technique. Where selected image enhancement techniques are identified by a particular template set 38, 40, or 42, technique selection logic 44 is responsible for processing technique selection criteria 37 to select template set 38, 40, or 42. Using the example above, where state variables 32-36 indicate that cartridge 12 is new or has been minimally used, technique selection criteria 37 will indicate that template set 38 is to be selected. Where state variables 32-36 reveal that cartridge 12 is beginning to wear and that wear affects the operation of cartridge 12, technique selection criteria 37 will indicate that template set 40 is to be selected. Finally, where state variables 32-36 reveal that cartridge 12 is well worn with minimal useful life remaining, technique selection criteria 37 will indicate that template set 42 is to be selected.

Technique execution logic 46 represents generally any programming capable of implementing an image enhancement technique. Technique execution logic 56 may perform this function by enhancing an image by selectively implementing image enhancement techniques. Where selected image enhancement techniques are identified by a particular template set 38, 40, or 42, technique execution logic 46 is responsible for executing that template set 38, 40, or 42. In doing so, technique execution logic 46 determines when a condition in a template set 38, 40, or 42 is met and then implements the image enhancement technique(s) and parameter(s) associated with that condition. It may be determined that more than one condition has been met at a given time.

Technique execution logic 46, depending on a selected template set 38, 40, or 42, can digitally enhance a rasterized image before it is printed and it can enhance a printed image in real time by affecting the operation of printing components 16 and/or 22 as the image is being printed. Preferably, real time aspects of technique execution logic 46, such as those that directly affect the modulation and deflection of laser 22A (FIG. 2), are performed using circuit level logic such as an ASIC (Application Specific Integrated Circuit).

State monitor 48 represents generally any combination of hardware and/or programming capable of monitoring the state of cartridge printing components 16 and updating state variables 32-36 accordingly. With reference to FIG. 2, state monitor 48 may be capable of identifying the amount of toner remaining in reservoir 14 and updating state variable 32 to reflect the identified amount. State monitor 48 may be able to update state variable 32 to reflect the duration that photoconductor drum 16A has been exposed to laser 22A and/or discharge lamp 22D. State monitor 48 may be able to update state variable 36 to reflect the number of pages printed during the life of cartridge printing components 16.

Printing logic 50 represent generally any programming capable of controlling the production of a printed page. Printing logic 50 is responsible for using technique selection logic 44 to select a template set 38, 40, or 42, using technique execution logic 46 to execute the selected template set 38, 40, or 42, and using cartridge and device printing components 16 and 22 to generate printed output.

State variables 32-36, shown in FIG. 4, could instead be stored in device memory 24, shown in FIG. 5. Preferably, state variables 32-36 are stored in cartridge memory 18. If cartridge 12 is removed from image forming device 10 and inserted into a different image forming device (not shown) then state variables 32-36 remain with cartridge 12. Where state variables 32-36 are stored in device memory 24, they do not follow cartridge 12 when it is removed and used elsewhere. Template sets 38-42, technique selection logic 44, and/or technique execution logic 46 may be stored in cartridge memory 18 and then loaded into device memory 24 to be utilized by printing logic 48 as needed.

Figures 6, 7:
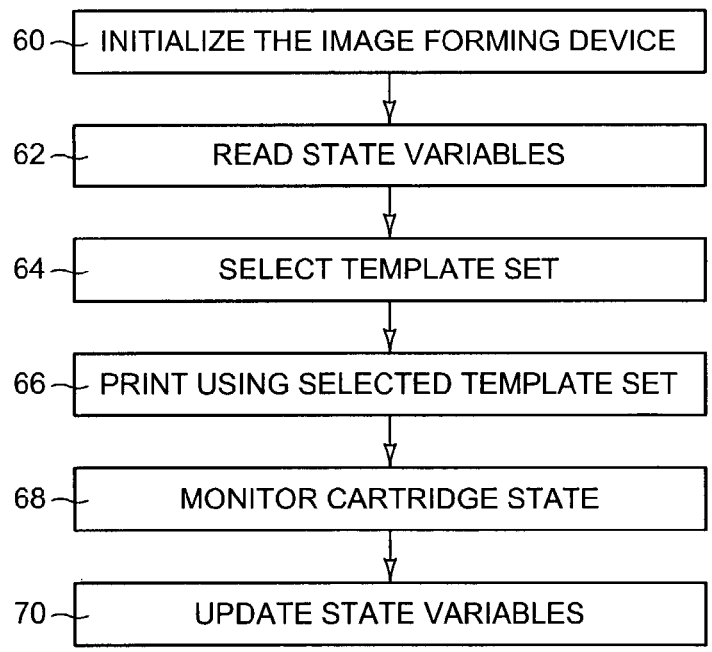
FIG. 6 illustrates an exemplary implementation of technique selection criteria in the form of a look-up table according to an embodiment of the present invention.
FIG. 7 is an exemplary flow diagram illustrating steps taken print using a selected image enhancement technique or techniques according to an embodiment of the present invention.

FIG. 6 illustrates an example of technique selection criteria 37 implemented in look-up table 37A. Lookup table 37A includes entries 52 to be processed by technique selection logic 44 to select a template set 38, 40, or 42. Each entry 52 includes data in a priority field 54, in a state condition field 56, and in a template set identifier field 58. The data in priority fields 54 of entries 52 dictate the order in which entries 52 are to be processed. The data in each state condition field 56 sets a condition relating to the current value or values of one or more state variables 32-36. The data in each template set identifier field 58 identifies a particular template set 38, 40, or 42.

To select a template set 38, 40, or 42, technique selection logic 44 processes entries 52 in a hierarchical order dictated by priority field 54 data of entries 52. When processing a given entry 52, technique selection logic 44 determines if a condition required by data in state condition field 56 for that entry 52 is being met. If that condition is being met, technique selection logic 44 selects the template set 38, 40, or 42 identified by data in template set identifier field 58 for that entry 52. Technique selection logic 44 then stops processing further entries 62. If the condition is not being met, technique selection logic 44 continues processing subsequent entries 52 in an order dictated by priority field 54 data.

The block diagrams of FIGS. 1-5 show the architecture, functionality, and operation of various implementations of the present invention. Each block may represent in whole or in part a module, segment, or portion of code that comprises one or more executable instructions to implement the specified logical function(s). Each block may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

OPERATION: The operation of the present invention will now be described with reference to the flow diagram of FIG. 7. FIG. 7 illustrates steps taken to print an image using image enhancement techniques selected and implemented according to state variables stored in cartridge memory 18.

Image forming device 10 is initialized (step 60). Initializing may involve turning on or resetting image forming device 10, or it may involve sending or receiving a print job. Where image forming device 10 is a laser or ink printer, step 60 may involve receiving a print job from a word processor running on a connected computer. Where image forming device 10 is a copier, step 60 may involve receiving instructions to print a scanned document. Next state variables are read (step 62) and a template set is selected (step 64). With reference to FIG. 5, steps 62 and 64 may be accomplished by technique selection logic 44. In completing step 64, technique selection logic 44 can select template set 38, 40, or 42 using technique selection criteria 37.

A print job or jobs are then printed using the selected template set (step 66). Referring back to FIGS. 1 and 5, printing logic directs cartridge and device printing components 16 and 22 to produce a printed image while directing technique execution logic 46 to enhance the printed image by implementing the template set 38, 40, or 42 selected in step 66

The state of cartridge 12 is monitored (step 68). For example, step 60 can involve identifying a toner or ink level. It can involve measuring the use of cartridge printing components 16 such as the duration to which photoconductive drum 16A has been exposed to laser 22A as well as the number of printed pages. State variables 32- 36 are updated accordingly (step 70).

Although the flow chart of FIG. 7 shows a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

CONCLUSION: The present invention has been shown and described with reference to the foregoing exemplary embodiments. It is to be understood, however, that other forms, details, and embodiments may be made without departing from the spirit and scope of the invention which is defined in the following claims.

What is claimed is:

1. A removable cartridge for an image forming device, the cartridge including cartridge I/O logic and a computer readable medium, wherein, the cartridge I/O logic is configured to allow the image forming device to communicate with the computer readable medium allowing the image forming device to access and process electronic data contained in the computer readable medium, the computer readable medium being formatted to store a state variable and programmed with technique selection criteria configured for being accessed and processed by the image forming device to cause the image forming device to select and implement an image enhancement technique, wherein the technique selection criteria includes a state condition associated with data identifying the image enhancement technique, the state condition being a circumstance relating to a current value of the state variable accessed from the computer readable medium that when met indicates that the identified image enhancement technique is to be implemented, the accessed state variable specifying at least one of: (a) a duration that a photoconductor drum within the removable cartridge has been exposed to an energized laser source by the image forming device; and (b) a duration that the photoconductor drum within the removable cartridge has been exposed to an energized discharge lamp by the image forming device.

2. A removable cartridge for an image forming device, the cartridge including cartridge I/O logic and a computer readable medium, wherein, the cartridge I/O logic is configured to allow the image forming device to communicate with the computer readable medium allowing the image forming device to access and process electronic data contained in the computer readable medium, the computer readable medium being formatted to store a state variable and programmed with technique selection criteria configured for being accessed and processed by the image forming device to cause the image forming device to select and implement an image enhancement technique, wherein the technique selection criteria comprises a look-up table containing an entry having data representing a state condition and data identifying a template set that identifies the image enhancement technique, the state condition being a circumstance relating to a current value of the state variable accessed from the computer readable medium that when met indicates that the identified template set is to be selected, the accessed state variable specifying at least one of: (a) a duration that a photoconductor drum within the removable cartridge has been exposed to an energized laser source by the image forming device; and (b) a duration that the photoconductor drum within the removable cartridge has been exposed to an energized discharge lamp by the image forming device.

3. The cartridge of claim 2, wherein the technique selection criteria comprises a look-up table containing a plurality of entries, each entry having data representing a state condition and data identifying a template set that identifies one or more image enhancement techniques.

4. The cartridge of claim 3, wherein the medium is formatted to store a plurality of state variables that can be used to determine if one or more of the state conditions is or are being met.

5. A removable cartridge for an image forming device, comprising:
   a printing component that can be utilized by the image forming device to assist in producing a printed image;
   a memory programmed to contain technique selection criteria and formatted to store a state variable reflecting a state of the printing component, the technique selection criteria and the state variable being configured to be accessed and processed by the image forming device to cause the image forming device to select and implement an image enhancement technique, wherein the technique selection criteria includes a state condition associated with data identifying the image enhancement technique, the state condition being a circumstance relating to a current value of the accessed state variable that when met indicates that the identified image enhancement technique is to be implemented, the state variable specifying at least one of: (a) a duration that a photoconductor drum within the removable cartridge has been exposed to an energized laser source by the image forming device; and (a) a duration that the photoconductor drum within the removable cartridge has been exposed to an energized discharge lamp by the image forming device.

6. The removable cartridge of claim 5, further comprising a reservoir for holding imaging material, and wherein the printing component can be utilized by the image forming device to assist in producing a printed image using imaging material from the reservoir.

7. A removable cartridge for an image forming device, comprising:
a printing component that can be utilized by the image forming device to assist in producing a printed image; and
a memory programmed to contain technique selection criteria and formatted to store a state variable reflecting a state of the printing component, the technique selection criteria and the state variable being configured to be accessed and processed by the image forming device to cause the image forming device to select and implement a particular image enhancement technique from a plurality of image enhancement techniques, wherein the technique selection criteria includes one or more state conditions to be used to select the particular image enhancement technique from the plurality of image enhancement techniques based on the value of the accessed state variable stored in the memory, each state condition being a circumstance relating to a current value of the state variable that when met indicates that the particular one of the image enhancement techniques are to be implemented, the state variable specifying at least one of: (a) a duration that a photoconductor drum within the removable cartridge has been exposed to an energized laser source by the image forming device; and (b) a duration that the photoconductor drum within the removable cartridge has been exposed to an energized discharge lamp by the image forming device.

8. A removable cartridge for an image forming device, comprising:
a printing component that can be utilized by the image forming device to assist in producing a printed image; and
a memory programmed to contain technique selection criteria and formatted to store a state variable reflecting a state of the printing component, the technique selection criteria and the state variable being configured to be accessed and processed by the image forming device to cause the image forming device to select and implement an image enhancement technique, wherein the technique selection criteria comprises a look-up table containing an entry with data representing a state condition and data identifying a template set, the state condition being a circumstance relating to a current value of the accessed state variable that when met indicates that the identified template set is to be selected, the state variable specifying at least one of (a) a duration that a photoconductor drum within the removable cartridge has been exposed to an energized laser source by the image forming device; and (b) a duration that the photoconductor drum within the removable cartridge has been exposed to an energized discharge lamp by the image forming device.

9. A removable cartridge for an image forming device, comprising:
a printing component that can be utilized by the image forming device to assist in producing a printed image; and
a memory programmed to contain technique selection criteria and formatted to store a state variable reflecting a state of the printing component, the technique selection criteria and the state variable being configured to be accessed and processed by the image forming device to cause the image forming device to select and implement a particular plurality of image enhancement techniques; wherein the technique selection criteria comprises a look-up table containing a plurality of entries, each entry having data representing a state condition and data identifying a template set, the template set identifying the particular plurality of image enhancement techniques, the state condition for each entry being a circumstance relating to a current value of a state variable that when met indicates that the template set identified by that entry is to be selected and the particular plurality of image enhancement techniques are to be implemented, the state variable specifying at least one of (a) a duration that a photoconductor drum within the removable cartridge has been exposed to an energized laser source by the image forming device; and (b) a duration that the photoconductor drum within the removable cartridge has been exposed to an energized discharge lamp by the image forming device.

10. A removable cartridge for an image forming device, comprising:
printing components that can be utilized by the image forming device to assist in producing a printed image; and
a memory programmed to contain technique selection criteria and formatted to store state variables each reflecting a state of one or more printing components, the technique selection criteria and the state variables being configured to be accessed and processed by the image forming device to cause the image forming device to select and implement an image enhancement technique, wherein the technique selection criteria includes a state condition associated with data identifying the image enhancement technique, the state condition being a circumstance relating to a current value of one of the accessed state variables that when met indicates that the identified image enhancement technique is to be implemented, the one of the state variables specifying at least one of: (a) a duration that a photoconductor drum within the removable cartridge has been exposed to an energized laser source by the image forming device; and (b) a duration that the photoconductor drum within the removable cartridge has been exposed to an energized discharge lamp by the image forming device.

11. A removable cartridge for an image forming device, comprising:
printing components that can be utilized by the image forming device to assist in producing a printed image; and a memory programmed to contain technique selection criteria and formatted to store state variables each reflecting a state of one or more printing components, the technique selection criteria and the state variables being configured to be accessed and processed by the image forming device to cause the image forming device to select and implement a particular plurality of image enhancement techniques;

wherein the technique selection criteria comprises a lookup table containing entries, wherein each entry contains data representing a particular state condition and data identifying a particular template set, each template set identifying a plurality of image enhancement techniques, the state condition of each entry being a circumstance relating to a current value of one of the state variables that when met indicates that the particular plurality of image enhancement techniques identified by the particular template set of that entry are to be implemented, the one of the state variables specifying at least one of: (a) a duration that a photoconductor drum within the removable cartridge has been exposed to an energized laser source by the image forming device; and (b) a duration that the photoconductor drum within the removable cartridge has been exposed to an energized discharge lamp by the image forming device.

12. The removable cartridge of claim 11, further comprising a reservoir for holding imaging material, and wherein the printing components can be utilized by the image forming device to assist in producing a printed image using imaging material from the reservoir.

13. The removable cartridge of claim 11, wherein the technique selection criteria includes electronic data to be used to select an image enhancement technique based on the value of a state variable stored in the memory.

14. The removable cartridge of claim 11, wherein the lookup table contains a plurality of entries, each entry having data representing a state condition and data identifying a template set, the template set identifying one or more image enhancement techniques.

15. A method for selecting image enhancement techniques, comprising:

providing a cartridge having printing components and a memory, the cartridge being for use in an image forming device, the memory formatted to store state variables and programmed to technique selection criteria, the technique selection criteria and the state variable being configured to be accessed and processed by the image forming device to cause the image forming device to select and implement a particular plurality of image enhancement techniques with respect to other pluralities of image enhancement techniques, wherein each state variable reflects a state of one or more of the printing components, and the technique selection criteria includes a state condition associated with data identifying the particular plurality of image enhancement techniques;

monitoring the state of the printing components;

updating one or more of the state variables in the memory to reflect the monitored state or states of one or more of the printing components; and processing the technique selection criteria to determine if the state condition is being met by one or more of the updated state variables;

if the state condition is being met, selecting and implementing the particular plurality of image enhancement techniques associated with the state condition, wherein at least one of the state variables specifies at least one of:

(a) a duration that a photoconductor drum within the removable cartridge has been exposed to an energized laser source by the image forming device; and (b) a duration that the photoconductor drum within the removable cartridge has been exposed to an energized discharge lamp by the image forming device.

16. A method for selecting image enhancement techniques, comprising:

providing a cartridge having printing components and a memory, the cartridge being for use in an image forming device, the memory formatted to store state variables and programmed to contain technique selection criteria, each state variable reflecting a state of one or more of the printing components, the state variables and the technique selection criteria being configured to be accesses and processed by the image forming device to cause the image forming device to select a particular plurality of image enhancement techniques from among other pluralities of image enhancement techniques technique selection criteria, wherein the technique selection criteria include one or more state conditions each associated with data identifying at least one of a plurality of template sets, each template set representing a different plurality of image enhancement techniques, each state condition being a circumstance relating to a current value of one of the state variables that when met indicates that the particular plurality of image enhancement techniques represented by the identified template set are to be selected and implemented, wherein at least one of the state variables specifies at least one of: (a) a duration that a photoconductor drum within the removable cartridge has been exposed to an energized laser source by the image forming device; and (b) a duration that the photoconductor drum within the removable cartridge has been exposed to an energized discharge lamp by the image forming device;

monitoring the state of the printing components;

updating one or more of the state variables in the memory to reflect the monitored state or states of one or more of the printing components; and processing the technique selection criteria with the one or more state variables to select a template set and implement the particular plurality of image enhancement techniques represented by the selected template set.

17. A computer readable medium having instructions for:

accessing a state variable and technique selection criteria from a memory of a removable cartridge of an image forming device, the state variable reflecting a state of a printing component for use in the image forming device;

processing technique selection criteria with the obtained state variable to select an image enhancement technique, the technique selection criteria including a state condition associated with the image enhancement technique, the state condition being a circumstance relating to a current value of the obtained state variable that when met indicates that the selected image enhancement technique is to be implemented, wherein the state variable specifies at least one of (a) a duration that a photoconductor drum within the removable cartridge has been exposed to an energized laser source by the image forming device; and (b) a duration that the photoconductor drum within the removable cartridge has been exposed to an energized discharge lamp by the image forming device; and implementing the selected image enhancement technique; and implementing the selected image enhancement technique using the image forming device.

18. The medium of claim 17, wherein the instructions for processing include instructions for processing technique selection criteria stored in memory integrated into a cartridge to select the image enhancement technique.

19. A computer readable medium having instructions for:
accessing, from a memory of a removable cartridge for an image forming device, state variables reflecting states of printing components for use in the image forming device, wherein at least one of the state variables specify at least one of: (a) a duration that a photoconductor drum within the printing component has been exposed to an energized laser source by the image forming device; and (b) a duration that the photoconductor drum within the printing component has been exposed to an energized discharge lamp by the image forming device;
accessing technique selection criteria programmed in the memory of a removable cartridge for the image forming device, the technique selection criteria including a state condition associated with a template set identifying a plurality of image enhancement techniques, the template set being one of a plurality of template sets each identifying a different plurality of image enhancement techniques;
processing the accessed technique selection criteria with the at least one state variable accessed state variable to determine if one of the state conditions is being met by the at least one state variable;
if the one of the state conditions is being met, choosing the template associated with the state condition being met;
selecting the plurality of image enhancement techniques identified by the chosen template set; and
implementing the selected plurality image enhancement techniques using the image forming device.

20. The medium of claim 19, having further instructions for monitoring the state of the printing component and updating the state variable.

21. The medium of claim 19, wherein:
the instructions for obtaining a state variable comprise instructions for obtaining a plurality of state variables each reflecting the state of a printing component; and
the instructions for selecting a template set comprise instructions for selecting a template set according to the obtained state variables.

22. A computer readable medium having instructions for:
accessing, from a memory of a removable cartridge for an image forming device, a plurality of state variables reflecting states of one or more printing components for use in the image forming device, wherein at least one of the state variables specifies at least one of: (a) a duration that a photoconductor drum within the printing component has been exposed to an energized laser source by the image forming device; and (b) a duration that the photoconductor drum within the printing component has been exposed to an energized discharge lamp by the image forming device;
accessing technique selection criteria programmed in a memory of the removable cartridge for the image forming device, the technique selection criteria including a state condition associated with a particular plurality of image enhancement techniques;
processing the accessed state variables with the accessed technique selection criteria to determine if the state condition is being met by one or more of the accessed state variables;
if the state condition is being met, selecting the particular plurality of image enhancement techniques associated with the state condition; and
implementing the particular plurality of image enhancement techniques.

23. A computer readable medium for use by an image forming device with a removable cartridge housing a memory, the medium having instructions for:
monitoring the state of printing components for the image forming device;
updating one or more state variables in the memory to reflect the monitored state or states of one or more of the printing components, wherein at least one state variable specifies at least one of: (a) a duration that a photoconductor drum within at least one of the printing components has been exposed to an energized laser source by the image forming device; and (b) a duration that the photoconductor drum within at least one of the printing components has been exposed to an energized discharge lamp by the image forming device;
accessing the updated state variables in the memory;
accessing technique selection criteria programmed in the memory of the removable cartridge, the technique selection criteria including a state condition associated with a particular plurality of image enhancement techniques;
processing the accessed undated state variable with the accessed technique selection criteria to determine if the state condition is being met by one or more of the updated state variables;
if the state condition is being met, selecting the particular plurality of image enhancement techniques associated with the state condition; and
implementing the particular plurality of image enhancement techniques.

24. A computer readable medium for use by an image forming device with a removable cartridge housing a memory, the medium having instructions for:
monitoring the state of printing components for the image forming device;
updating one or more state variables in the memory to reflect the monitored state or states of one or more of the printing components, wherein at least one state variable specifies at least one of: (a) a duration that a photoconductor drum within at least one of the printing components has been exposed to an energized laser source by the image forming device; and (b) a duration that the photoconductor drum within at least one of the printing components has been exposed to an energized discharge lamp by the image forming device;
accessing the undated state variables in the memory;
accessing technique selection criteria from the memory, the technique selection criteria including a state condition associated with a particular plurality of image enhancement techniques;
processing the accessed state variables with the accessed technique selection criteria to select the particular plurality of image enhancement techniques from among other pluralities of image enhancement techniques; and
implementing the particular plurality of image enhancement techniques.

* * * * *

UNITED STATES PATENT AND TRADEMARK OFFICE
CERTIFICATE OF CORRECTION

| | | |
|---|---|---|
| PATENT NO. | : 7,422,310 B2 | Page 1 of 1 |
| APPLICATION NO. | : 10/423255 | |
| DATED | : September 9, 2008 | |
| INVENTOR(S) | : Shell S. Simpson et al. | |

It is certified that error appears in the above-identified patent and that said Letters Patent is hereby corrected as shown below:

In column 9, line 13, in Claim 5, delete "(a)" and insert -- (b) --, therefor.

In column 14, line 27, in Claim 23, delete "undated" and insert -- updated --, therefor.

In column 14, line 51, in Claim 24, delete "undated" and insert -- updated --, therefor.

Signed and Sealed this

Thirtieth Day of December, 2008

JON W. DUDAS
*Director of the United States Patent and Trademark Office*